(12) United States Patent
Murao

(10) Patent No.: US 10,083,542 B1
(45) Date of Patent: Sep. 25, 2018

(54) METHOD AND SYSTEM TO COMPARE AND SEARCH POLYHEDRAL SHAPE

(75) Inventor: Takaaki Murao, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 09/616,772

(22) Filed: Jul. 14, 2000

(30) Foreign Application Priority Data

Oct. 21, 1999 (JP) .................................. 2011-299148

(51) Int. Cl.
  *G06T 17/00* (2006.01)
(52) U.S. Cl.
  CPC .................................. *G06T 17/00* (2013.01)
(58) Field of Classification Search
  CPC .................................................. G06T 17/00
  See application file for complete search history.

(56) References Cited

U.S. PATENT DOCUMENTS 4,546,978 A * 10/1985 David ........................... 273/146
5,594,559 A * 1/1997 Sato et al. ........................ 359/8

* cited by examiner

*Primary Examiner* — Weiming He
(74) *Attorney, Agent, or Firm* — W&C IP; Daniel P. Morris

(57) ABSTRACT

Polyhedral data is compared with limited information while keeping accuracy. A comparison of two polyhedrons is accomplished as follows. (1) A squared-sum of the difference of primary moment functions and a squared-sum of the difference of secondary moment functions are separately sought at sample points of polyhedron Ma, Mb, normalize them and compute the sum of both, or seek sum functions of the primary moment functions and the secondary moment functions to compute the squared-sum of the difference of the sum functions, the primary moment function all the sample points of polyhedral data that occupy central symmetry directions are blended in the same sign, which is the different sign in the case of the secondary moment function, the functions having variables representing points on a surface of a sphere of which center is the center of gravity of the polyhedron and a value which is an axial moment value, the axis defined as a line through the points and the center, and (2) in the case that the value of the sum is a certain threshold or less, it is determined that the polyhedrons are similar in shape.

2 Claims, 13 Drawing Sheets

Key 0.0          1st. 0.057146          2nd. 0.412821

3th. 0.480274    4th. 0.490979          5th. 0.681463

6th. 0.698794    7th. 0.957475          8th. 0.982084

$$wa = \frac{1}{S} \Sigma \frac{S_k}{3}$$

S is the total surface area of polyhedral data.
$S_k$ represents the area of each surface including a vertex.

Adjustment by an operator:
Camera height
Camera angle
Screen size
Screen distance Adjustment by an operator:
Viewpoint height
Product size Demo operations by an operator:
Height of the product movement surface
Position/direction of a product
Direction of viewpoint
Color/texture/materials of a product

METHOD AND SYSTEM TO COMPARE AND SEARCH POLYHEDRAL SHAPE

1. FIELD OF THE INVENTION

The present invention relates to a method and a system for searching polyhedrons of a similar shape, particularly to a method and a system for representing a polyhedron by using a function which effectively converts a feature value of a polyhedron into numbers and comparing polyhedrons by using values of the functions, and a method and a system for searching similar polyhedrons from more than one polyhedrons.

2. RELATED ART

Reference 1 ("Consideration of Multimedia Information Retrieval—Approach from 3D Model Information," Hirotsu and Ouchi, Proceeding of WISS '96, 1996, pp. 179-188) mentions a technique which uses, for shape matching, geometric features such as a space occupying array, a "shape eigenvalue" which is calculated from a ratio of the volume of each object to the volume of the bounding box, a normal vector, abstraction to a representative geometric shape for each part, a rotating body, a plane and a right angle. In Reference 1, shape matching is performed by using a space occupying array, and a shape eigenvalue. By such a method, however, it is possible to compute tolerance while it is not practical to have an array as a feature value since the value becomes enormous. To acquire accuracy, it is necessary to have a feature value greater than the original data.

Reference 2 ("A Content-based Search Engine for CAD and VRML," Eric Paquet and Mrc Roiux, Motion and Machine Vision in the Automotive Industries, Proc. ISATA 31, 1998, pp. 427-434) mentions a method wherein, after normalizing a location, scale and direction by a method similar to that set forth in the details of the present invention, the following three types of histograms are created and compared by the angle of a vector linking the first and second axes and the center of gravity acquired for adjusting direction to the center of gravity of the surfaces consisting a polyhedron.

The first histogram is a histogram created without distinguishing an angle with the first axis from an angle with the second axis.

The second histograms are two histograms separately created an angle with the first axis and an angle with the second axis.

The third histogram is a histogram defined on a two-dimensional plane consisting of an angle with the first axis and an angle with the second axis.

However, the first and second histograms of Reference 2 can only provide rough accuracy because they compare local information of a shape in a fairy folded up state. Moreover, the third histogram compares local shapes on average close by, so the amount of information to be held also increases if an attempt is made to improve accuracy.

A geometric shape of a polyhedron is represented in the form of a coordinate of a mesh's node, and a generally used polyhedral mesh is arbitrarily cut. If a coordinate of an arbitrarily cut mesh's node is used to convert a polyhedron into numbers for comparison, accuracy of similarity computed in comparison of polyhedrons converted into numbers is not fixed since the mesh is not uniformly cut among different polyhedrons, so it will cause the order of the search results to be reversed in the case of a similar shape search of polyhedrons.

Moreover, when a polyhedral surface is to be converted into numbers, for the purpose of comparison of polyhedrons, by a function defined on a surface of a sphere of which center is the center of gravity of the polyhedron, if polyhedral surfaces are multiply intersecting on a half line linking the center of gravity with a certain point on the spherical surface, how to cope with it constitutes an issue. Since there is one value corresponding to this one point on the spherical surface in the function defined on the spherical surface, the information will be missing if with only one function. On the other hand, when N functions are used to cope with a case of N-fold intersection, if arbitrary two polyhedrons are represented by function (i=0, 1, . . . n) and function (j=0, 1, . . . m), it constitutes an issue which n functions and m functions should be associated and compared in what way. Also, as this association changes according to mutual relationship of the polyhedral shapes to be compared, it significantly deteriorates efficiency of a comparison algorithm.

SUMMARY OF THE INVENTION

Thus, an object to be attained by the present invention is to provide a method and a system for comparing and searching polyhedral data with limited information while keeping accuracy.

Another object is to provide a method for representing a polyhedron for comparison in a compact manner not depending on resolution of a polyhedron.

A further object is to provide a method and a system for comparing and searching polyhedral data to be able to seek tolerance with any accuracy.

A still further object is to provide a method and a system for comparing and searching polyhedral data wherein accuracy of similarity computed in comparison of polyhedrons converted into numbers is fixed.

A still further object is to provide a method and a system for comparing and searching polyhedral data wherein, if a polyhedral surface is converted into numbers for the purpose of comparison of polyhedrons by a function defined on a surface of a sphere of which center is the center of gravity of the polyhedron, functions can easily be associated even though mutual relationship of the polyhedral shapes changes.

To attain the above objects, first, in comparing two polyhedrons, it is organized as follows: (1) separately seeking a squared-sum of the difference of primary moment functions and a squared-sum of the difference of secondary moment functions at sample points of polyhedron Ma, Mb, normalize them and compute the sum of both or seeking sum functions of the primary moment functions and a secondary moment functions to compute the squared-sum of the difference of the sum functions. In the primary moment function all the sampling points of polyhedral data that occupy central symmetry directions are blended in the same sign, which is the different sign in the case of the secondary moment function, the functions having variables representing points on a surface of a sphere of which center is the center of gravity of the polyhedron and a value which is an axial moment value, the axis defined as a line through the points and the center; and (2) in the case that the value of the sum is a certain threshold or less, determining that the polyhedrons are similar in shape.

Here, the primary moment functions and secondary moment functions are the functions having variables representing points on a surface of a sphere of which center is the center of gravity of the polyhedron and a value which is an axial moment value, the axis defined as a line through the points and the center and having an object of representing a polyhedral shape by converting it into numbers. The primary moment functions and secondary moment functions are explained further in detail as follows.

In a state where the location and size of polyhedral data to be compared is normalized, a n-th degree of axial moment value determined by axis (v_sphere) which is an arbitrary moment axis is assumed to be a function of v_sphere (hereafter referred to as moment function Mo(v_sphere)), the axis corresponding to v_sphere which is an arbitrary point on a surface of a sphere of which radius is 1.0. FIG. 1 shows a drawing to explain definition of a moment function of the present invention. Where, $va_i$ represents an individual sample point on a surface of polyhedral data, $wa_i$ weight of an individual sample point, and Ga the center of gravity of polyhedron Ma. In this case, a primary moment function is represented by the following expression.

Expression 1

$$Moa1(v\_sphere) = \text{axis}(v\_sphere) \left( \sum_i wa_i \left( |va_i|^{\frac{n}{2}-1} va_i \right)^T \left( |va_i|^{\frac{n}{2}-1} va_i \right) \right)$$

$$\text{axis}(v\_sphere)^T$$

$$= \sum_i (\cos\alpha_{ij})^2 (ra_i)^n$$

where, n is a degree of a moment function.

Moreover, a secondary moment function is represented by the following expression.

Expression 2

$$Moa2(v\_sphere) = \text{axis}(v\_sphere) \left( \sum_i wa_i \left( |va_i|^{n-1} va_i \right) \right)$$

$$= \sum_i \cos\alpha_{ij} (ra_i)^n$$

where, n is a degree of a moment function.

At this time, the portions of the moment function, $\Sigma wa_i (|va_i|^{(n/2-1)} va_i)^T (|va_i|^{(n/2-1)} va_i)$ and $\Sigma w_i va_i |va_i|^{n-1}$ are preserved as representation of polyhedral data for comparison.

The following shows how to compute the shape difference (tolerance) of the present invention, and it indicates that the computed shape difference is equivalent to the difference of local moment value. Moreover, details of how to derive primary and secondary moment functions are clarified in the [Preferred Embodiments] of the present invention. Polyhedral data Ma, Mb are represented as follows in a polar coordinate system of which sample point of origin is the point of gravity by using sampling points v_sphere_i evenly scattered on a surface of a sphere. The term of tolerance of the present invention is used from the viewpoint of the shape difference in the sense that the lower the value is, the more similar the shape.

Ma: $wa_i$, $ra_i$

Mb: $wb_i$, $rb_i$

Where, $wa_i$ and $wb_i$ are weight of a point.

On the other hand, comparison between the primary and secondary moment functions can be represented as follows by taking adequate points v_sphere_j.

Expression 3

$$\sum_j \left( \sum_i (\cos\alpha_{ij})^2 (wa_i(ra_i)^n - wb_i(rb_i)^n) \right)^2$$

$$\sum_j \left( \sum_i \cos\alpha_{ij} (wa_i(ra_i)^n - wb_i(rb_i)^n) \right)^2$$

where, n is a degree of a moment function, and $\alpha_{ij}$ is an angle made by $v\_sphere_i$ and $v\_sphere_j$.

$(\cos \alpha_{ij})^2$ is cycle $\pi$ in the primary moment function, and the relationship of $(\cos \alpha_{ij}+\pi) = -\cos \alpha_{ij}$ holds in the secondary moment function. A squared-sum of the difference of the primary and secondary moment functions can be represented as follows by representing as $ra_{i+m}$, the points of point symmetry to the center of gravity of arbitrary $ra_i$, $rb_i$.

Expression 4

$$\sum_j \left( \sum_i (\cos\alpha_{ij})^2 \right.$$

$$\left. ((wa_i(ra_i)^n - wb_i(rb_i)^n) + (wa_{i+m}(ra_{i+m})^n - wb_{i+m}(rb_{i+m})^n)) \right)^2$$

$$\sum_j \left( \sum_i \cos \right.$$

$$\left. \alpha_{ij}((wa_i(ra_i)^n - wb_i(rb_i)^n) - (wa_{i+m}(ra_{i+m})^n - wb_{i+m}(rb_{i+m})^n)) \right)^2$$

where, n is a degree of a moment function.

Namely, expression 4 means comparing with an individual v_sphere_j a total sum of polyhedral sampling points locally weighted by functions $(\cos \alpha_{ij})^2$ and $(\cos \alpha_{ij})$ determined by angle $\alpha_{ij}$. Here, in $0 \le \alpha_{ij} \le \pi/2$, $(\cos \alpha ij)^2$ is approximate to $\cos \alpha_{ij}$, and noting arbitrary sampling point v_sphere_j of the moment functions, it will be the following expression if squared-sums of the differences of the primary and secondary moment functions are added in a state where it is fixed as to component j.

Expression 5

$$\left( \sum_i (D_i + D_{i+m}) \right)^2 + \left( \sum_i (D_i - D_{i+m}) \right)^2 = \sum_k \sum_l (D_k + D_{k+m})(D_l + D_{l+m}) +$$

$$\sum_k \sum_l (D_k - D_{k+m})(D_l - D_{l+m})$$

$$= 2\sum_k \sum_l (D_k)(D_l) +$$

$$2\sum_k \sum_l (D_{k+m})(D_{l+m})$$

$$= 2\left( \sum_i (D_i) \right)^2 + 2\left( \sum_i (D_{i+m}) \right)^2$$

where, $$D_i - \sum_i (\cos\alpha_{ij})^2 (wa_i(ra_i)^n - wb_i(rb_i)^n),$$

and n is a degree of a moment function.

When comparing, local comparison is implemented by changing v_sphere_j to weight different local portions.

Comparison Method 2

As in method 1,

Ma: $wa_i$, $ra_i$

Mb: $wb_i$, $rb_i$

Where, $wa_i$ and $wb_i$ are weight of a point.

On the other hand, a squared-sum of the difference of sum functions of the primary moment functions and a secondary moment functions can be represented as follows by taking an adequate sampling point v_sphere_j.

Expression 6

$$\sum_j \left( \sum_i wa_i((\cos\alpha_{ij})^2(ra_i)^n + \cos\alpha_{ij}(ra_i)^n) - \sum_i wb_i((\cos\alpha_{ij})^2(rb_i)^n + \cos\alpha_{ij}(rb_i)^2) \right)^2$$

where, n is a degree of a moment function, and $\alpha_{ij}$ is an angle made by v_sphere_$i$ and v_sphere_$j$.

The cycle of $(\cos\alpha_{ij})^2$ is $\pi$ in the primary moment function, and the relationship of $(\cos\alpha_{ij}+\pi)=-\cos\alpha_{ij}$ holds in the secondary moment function. Comparison of sum functions of the primary moment functions and secondary moment functions can be represented as follows by representing as $ra_{i+m}$, $rb_{i+m}$ the points of point symmetry to the center of gravity of arbitrary $ra_i$, $rb_i$.

Expression 7

$$\sum_j \left( \sum_i (\cos\alpha_{ij})^2 \right.$$
$$((wa_i(ra_i)^n - wb_i(rb_i)^n) + (wa_{i+m}(ra_{i+m})^n - wb_i(rb_{i+m})^n)) +$$
$$\left. \sum_i \cos\alpha_{ij}((wa_i(ra_i)^n - wb_i(rb_i)^n) - (wa_{i+m}(ra_{i+m})^n - wb_i(rb_{i+m})^n)) \right)^2$$

where, n is a degree of a moment function.

Namely, expression 7 means comparing with an individual v_sphere_j a total sum of polyhedral sampling points locally weighted by functions $(\cos\alpha_{ij})^2$ and $(\cos\alpha_{ij})$ determined by angle $\alpha_{ij}$. Here, in $0 \le \alpha_{ij} \le \pi/2$, $(\cos\alpha_{ij})^2$ is approximate to $\cos\alpha_{ij}$, and noting arbitrary sampling point v_sphere_j of the moment functions, comparison of sum functions of the primary moment functions and secondary moment functions is considered in a state where it is fixed as to component j.

Expression 8

$$\left( \sum_i (cso\alpha_{ij})^2 (wa_i(ra_i)^n - wb_i(rb_i)^n) \right)^2$$

where, n is a degree of a moment function.

When comparing, local comparison is implemented by changing v_sphere_j to weight different local portions.

To keep constant accuracy of similarity computed in comparison of polyhedrons converted into numbers, the sample points for comparison should be sought from polyhedrons by the following method in the form tailored to a numerical conversion technique of grasping as a geometric shape a vector from the center of gravity of a polyhedron to points on its surface.

Method 1

Seeking sample points of the polyhedron as nodes of the optimized mesh of the polyhedron. The optimization of the mesh is performed by subdividing or joining edges of the mesh as to the length of edges become even, when the points on a surface of polyhedron mapped to the points on a surface of sphere; whose center is the center of gravity of the polyhedron. The mapping maps points on a surface of the polyhedron to the points of intersection of the lines linking points on the polyhedron and a sphere, of which center is the center of gravity of the polyhedron. Or, Method 2

Seeking sample points of the polyhedron as points of intersection of lines linking a center of sphere, whose center is the center of mass of the polyhedron, and points on a surface of a sphere. The points on the surface of a sphere are generated as to the dense of the points will become even.

Weight of a sample point is sought by the following method.

Method 3

To determine it from a total sum of the area of the triangles consist of the mesh of the polyhedron that connected to the sample point. Or, Method 4

When the points on a polyhedron are mapped to a point of intersection of the line linking each point and the center of gravity of the polyhedron and a surface of a sphere of which center is the center of gravity of the polyhedron, weight of each point is determined from a total sum of the area of the mapped triangles connected to the point.

The following explains a method by which, if polyhedral surfaces are multiply intersecting on a half line linking the center of gravity with a certain point on the spherical surface, functions can easily be associated even though mutual relationship of the polyhedral shapes changes.

Define two categories of piecewise surface of polyhedron namely front-faces and back-faces. The front-faces are the piecewise surface, whose radius vectors from the center of mass of the polyhedron to points on piecewise surface, and the normal vectors of the points on piecewise surface are in the same directions. In the case of back-faces, the radius vectors and the normal vectors are in the different directions. On each radius vector, the area inbetween a intersection point on front-face and a intersection point back-face determined as a inside of the polyhedron.

Comparison between a certain area inside the polyhedron on a radial vector of polyhedron P_a and a certain area inside the polyhedron on a radial vector of polyhedron P_b of the same direction is considered. The distance from the center of gravity of each polyhedron to a boundary of the area inside the polyhedron on the radial vector on which attention is focused is defined as shown in FIG. 9.

The upper part of FIG. 9 explains a radial vector to a certain direction in polyhedron Pa, and the lower part of FIG. 9 explains a radial vector to the same direction in polyhedron Pb. The center of gravity of Pa refers to that of polyhedron Pa. The normal vector of Pa refers to the normal of polyhedron Pa at the starting point of the arrow marked in the Pa drawing. The radial vector of Pa refers to each of the vectors from the center of gravity of Pa, with polyhedron Pa as a starting point, to the points on polyhedron Pa. The front-face of Pa is a surface on polyhedron Pa of which inner product of the normal vector of Pa corresponding to the points on the surface and the radial vector of Pa is positive. The back-face of Pa is a surface on polyhedron Pa of which inner product of the normal vector of Pa corresponding to the points on the surface and the radial vector of Pa is negative. $ra_0, ra_1$ represents the distance between the point of intersection of polyhedron Pa and a radial vector and the center of gravity of Pa on the same radial vector. In FIG. 9, it intersects at two points, where subscript 0 indicates a point of intersection with the back-face and subscript 1 indicates a point of intersection with the front-face. Definitions of terms as to polyhedron Pb are the same as those for polyhedron Pa.

When comparing the areas inside the polyhedrons on and closest to two radial vectors in the same direction from the centers of gravity of polyhedrons Pa, Pb to be compared, the positional relationship between the areas inside polyhedrons Pa, Pb is classified as follows.

(a) Inclusion: A case where one area includes the other.
(b) Overlapping: A case where areas are mutually overlapping.
(c) Discrete: A case where no areas are mutually overlapping.

FIG. 10 illustrates classification of the above (a), (b) and (c). The left, middle and right of FIG. 10 are on radial vectors of the same direction of polyhedrons Pa, Pb and representing the positional relationship of the areas inside the polyhedron neighboured the front-face and the back-face. First, the left shows an internal area in a relationship of inclusion, the middle an internal area in a relationship of overlapping and the right an internal area in a discrete relationship. $ra_0, ra_1, rb_0, rb_1$ represent the distance from the boundary of an internal area of a polyhedron on radial vectors of the same direction of the respective polyhedrons Pa, Pb to the center of gravity of each polyhedron.

A difference is defined as in Table 1 in each relationship, which is called a difference as a standard. The following shows how to compute a difference as a standard.

TABLE 1

| Inclusion | Overlapping | Discrete |
|---|---|---|
| $\|rb_0 - ra_0\| + \|ra_1 - rb_1\|$ | $\|rb_0 - ra_0\| + \|rb_1 - ra_1\|$ | $\|ra_1 - ra_0\| + \|rb_1 - rb_0\|$ |

In actual comparison, plural areas inside a polyhedron exist on a radial vector, and when comparing two polyhedrons, any area inside a polyhedron on a radial vector to the same direction is classified into one of the above relationships.

The present invention resolves the objects by holding and comparing two types of numeric data for one polyhedron so as to form a useful correlation to the above difference as a standard. Two concrete methods for that purpose are explained as follows.

Method 5

The direction of a radial vector from the center of gravity of a polyhedron to the points on a surface thereof and the direction of a normal vector of the points thereon are compared so as to divide them into a set of points of the same directions and a set of them of different directions, which are separately converted into numbers. When comparing them, the two types of numeric data are separately compared so that an average of the computed tolerances is deemed to be the tolerance. The average of differences of numeric data sought from the points on the front-face and differences of numeric data sought from the points on the back-face can be represented as follows.

$$|ra_1 - ra_0| + |rb_1 - rb_0| \qquad \text{Expression 9}$$

A difference acquired by averaging the two types of numeric data will always have the following correlation with a difference as a standard in each case.

TABLE 2

| Inclusion | Overlapping | Discrete |
|---|---|---|
| Equivalent to the difference as a standard | Equivalent to the difference as a standard | Always larger than the difference as a standard |

Method 6

The direction of a radial vector from the center of gravity of a polyhedron to the points on a surface thereof and the direction of a normal vector of the points thereon are compared so as to divide them into a set of points of the same directions and a set of them of different directions, which are converted into numbers by assigning weights of the same sign and different signs respectively. When comparing them, the two types of numeric data are separately compared so that an average of the computed tolerances is deemed to be the tolerance. The correlation between a difference of the two types of numeric data and a difference as a standard will be as follows.

$$|(ra_1 + ra_0)| - |(rb_1 + rb_0)| \qquad \text{Expression 10}$$

First, a difference of numeric data acquired by assigning a weight of the same sign will be as follows.

TABLE 3

| Inclusion | Overlapping | Discrete |
|---|---|---|
| Correlation with the difference as a standard is weak. It may become 0 | Always equivalent to the difference as a standard | Always larger than the difference as a standard |

Next, a difference of numeric data acquired by assigning a weight of a different sign will be as follows.

$$|(ra_1 - ra_0)| - |(rb_1 + rb_0)| \qquad \text{Expression 11}$$

TABLE 4

| Inclusion | Overlapping | Discrete |
|---|---|---|
| Equivalent to the difference as a standard | Always smaller than the difference as a standard | Correlation with the difference as a standard is weak. It may become 0 |

Thus, a difference acquired by averaging differences of the two types of numeric data will always have the following correlation with a difference as a standard in each case.

TABLE 5

| Inclusion | Overlapping | Discrete |
|---|---|---|
| Always ½ or more of the difference as a standard | Always smaller than the difference as a standard | Always ½ or more of the difference as a standard |

DESCRIPTION OF THE PREFERRED EMBODIMENTS

Figure 1:
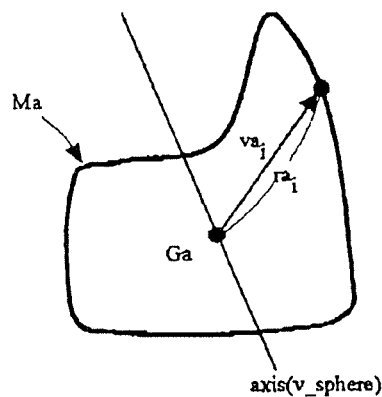
FIG. 1 is a drawing explaining the definition of moment functions of the present invention.
Figure 2:
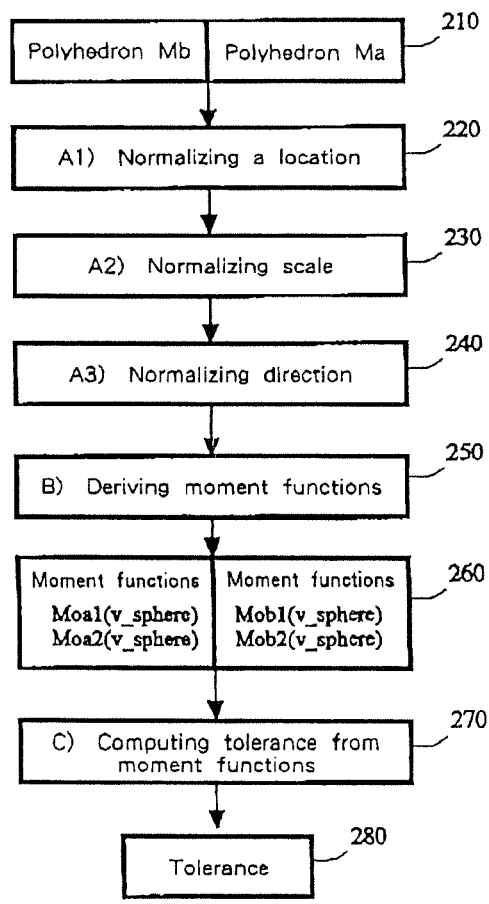
FIG. 2 is a block diagram for shape similarity search of the present invention.

Embodiments of the present invention in the case that similar shapes are searched by using a shape as a key are described as follows. As 3D (three-dimensional) shapes are compared, it is a prerequisite that a location, scale and direction of a polyhedron is normalized. However, these methods are known. When searching, the primary and secondary moment functions are computed from key polyhedral data and the shape difference is computed from the primary and secondary moment functions of likely polyhedral data. FIG. 2 shows a block diagram for shape similarity search of the present invention. Block 220 is a block for normalizing locations of polyhedrons Ma, Mb which were input in block 210. Block 230 is a block for normalizing scale. Block 240 is a block for normalizing direction of polyhedrons. These blocks are equal to a preprocessing part of the moment functions. Block 250 is a block for deriving the moment functions used in the present invention. And Block 270 is a block for computing the shape difference from the moment functions. Each of the blocks is explained further in detail as follows.

(A1) Normalizing a Location

Figure 3:
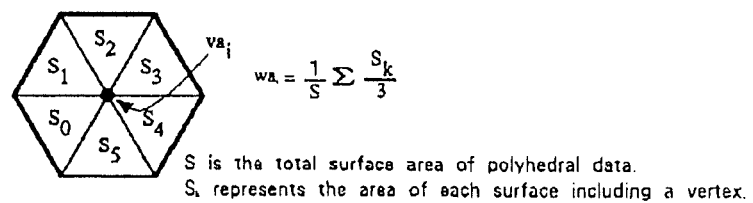
FIG. 3 is a drawing showing how to compute vertex weight.

Alignment is performed by using the center of gravity. Here, the center of gravity of polyhedral data and its weight per vertex are acquired in the following manner. FIG. 3 shows how to compute weight of vertex $va_i$. Mesh Ma is split in triangles and an area of respective surfaces is acquired (an area is acquired from an outer product of a vector making up two sides of a triangle) so as to acquire weight of individual vertices in the manner indicated in FIG. 3. Center of gravity Ga of mesh Ma is acquired by using the acquired weight, so the vertex coordinates are redefined with Ga as their point of origin.

(A2) Normalizing Scale

If the distance between the vertices consisting Ma and the center of gravity is $ra_i$, scale is acquired through the following expression by using the vertex weight $w_i$ acquired in (A1).

Expression 12

$$\text{scale} = \frac{\sum ra_i wa_i}{\sum wa_i}$$

And the coordinates of the vertices consisting Ma are multiplied 1/scale-fold. Thus, the scale is normalized so that the volume of the polyhedral data will be equal.

(A3) Normalizing Direction

If a point on a surface of polyhedral data Ma is $Va_i$, a primary moment function is acquired in the following manner.

Expression 13

$$Moa1(v\_sphere) = \sum_i wa_i axis(v\_sphere)\left(|va_i|^{\frac{n}{2}-1} va_i\right)^T \left(|va_i|^{\frac{n}{2}-1} va_i\right) axis(v\_sphere)^T$$

where, n is a degree of a moment function.

If $wa_i(|va_i|^{(n/2-1)}va_i)^T(|va_i|^{(n/2-1)}va_i)$ is diagonalized in decreasing order of eigenvalues so that the eigenvectors will be along x, y and z axes respectively, it will be the following expression.

Expression 14

$$Moa1(v\_sphere) = axis(v\_sphere)R\begin{pmatrix}\lambda_0 & & \\ & \lambda_1 & \\ & & \lambda_2\end{pmatrix}R^{-1}axis(v\_sphere)^T$$

where, $\lambda_0$, $\lambda_1$ and $\lambda_2$ are eigenvalue, and R is a rotating matrix for diagonalization. Eigenvectors are kept as a coefficient of a primary moment function.

(B) Deriving a Moment Function

The primary moment function was already acquired in normalizing direction. A secondary moment function is acquired as in the following expression by using the rotating vector R acquired by normalizing direction.

Expression 15

$$Moa2(\text{v\_sphere}) = axis(\text{v\_sphere}) R \sum_i (wa_i |va_i|^{n-1} va_i)$$

where, n is a degree of a moment function.

The primary and secondary moment functions have values indicated in Expressions 1 and 2 respectively.

(C) Computing Shape Difference from Moment Functions

When polyhedral data Ma, Mb are given, if the sample points evenly scattered on a surface of a sphere are v_sphere_j, their shape difference (tolerance) according to comparison method 1 is acquired by the following expression (the shape difference is acquired with arbitrary accuracy by increasing or decreasing the number of the sample points v_sphere_j).

Expression 16

$$\sum_j (Moa1(\text{v\_sphere}_j) - Mob1(\text{v\_sphere}_j))^2 +$$

$$C \sum_j (Moa2(\text{v\_sphere}_j) - Mob2(\text{v\_sphere}_j))^2$$

where, c is a constant for correcting an error approximate to $(\cos \alpha_{ij})^2 \cong \cos \alpha_{ij}$ in $$0 \le \alpha_{ij} \le \frac{\pi}{2}.$$

n is a degree of a moment function.

Their shape difference (tolerance) according to comparison method 2 is acquired by the following expression (the shape difference is acquired with arbitrary accuracy by increasing or decreasing the number of the sample points).

Expression 17

$$\sum_j (Moa1(\text{v\_sphere}_j) + c \cdot Moa2(\text{v\_sphere}_j)) -$$

$$(Mob1(\text{v\_sphere}_j) + c \cdot Mob2(\text{v\_sphere}_j))^2$$

where, c is a constant for correcting an error approximate to $(\cos \alpha_{ij})^2 \cong \cos \alpha_{ij}$ in $$0 \le \alpha_{ij} \le \frac{\pi}{2}.$$

It is determined that the smaller the above shape difference is, the more approximate polyhedral data Ma, Mb are. In this case, it is also possible to define a certain threshold and determine that polyhedral data Ma, Mb are approximate if the above shape difference value is lower than the threshold. Conversely, it is also possible to determine that polyhedral data Ma, Mb are not approximate if the above shape difference value exceeds the threshold. This can be used not only in comparing two polyhedral shapes but also in polyhedral shape search. For instance, in the case that a shape most similar to a specific polyhedron M is searched from a set of plural polyhedrons, the shape difference value is acquired by using the above moment functions so as to perform polyhedral shape search by using the value. While it may be determined that, of the computed shape difference values, a polyhedron of the smallest value is a polyhedron most similar to a specific polyhedron M, in preparation for all different shapes, it is actually determined that, of the computed shape difference values, a polyhedron of a certain threshold or less and the smallest value is a polyhedron most similar to a specific polyhedron M.

Figure 4:
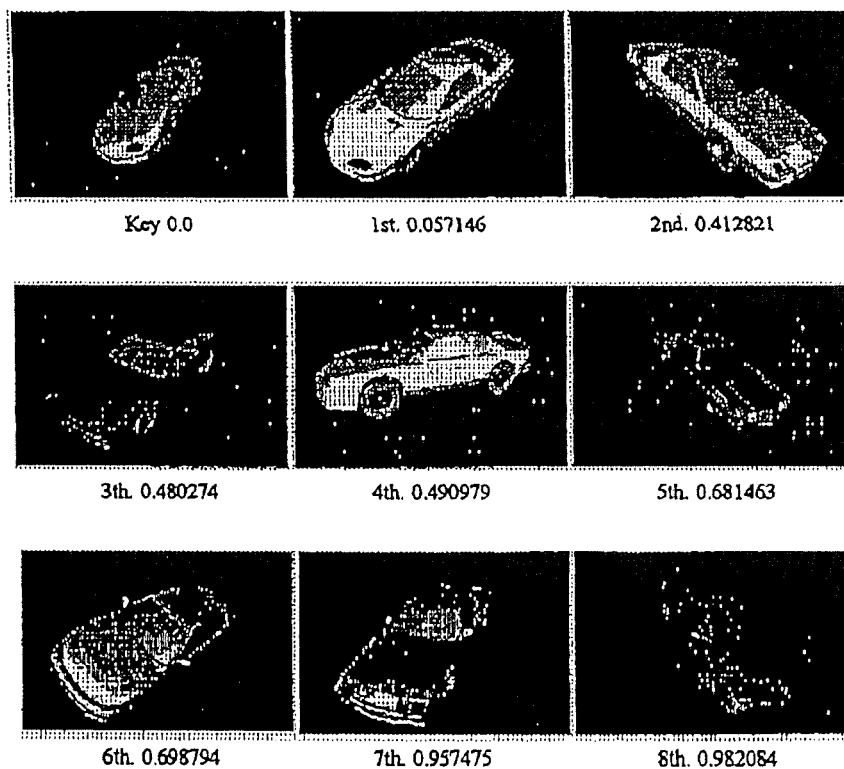
FIG. 4 is an example of performing shape similarity search with arbitrary polyhedral data as a search key.
Figure 5:
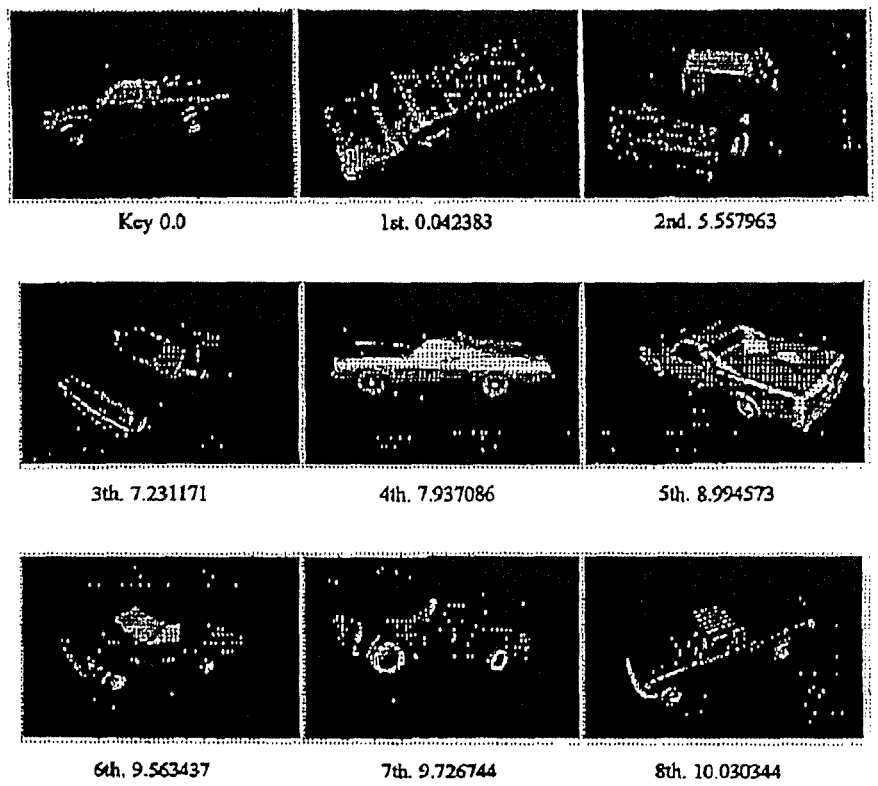
FIG. 5 is an example of performing shape similarity search with arbitrary polyhedral data as a search key.
Figures 6, 7:
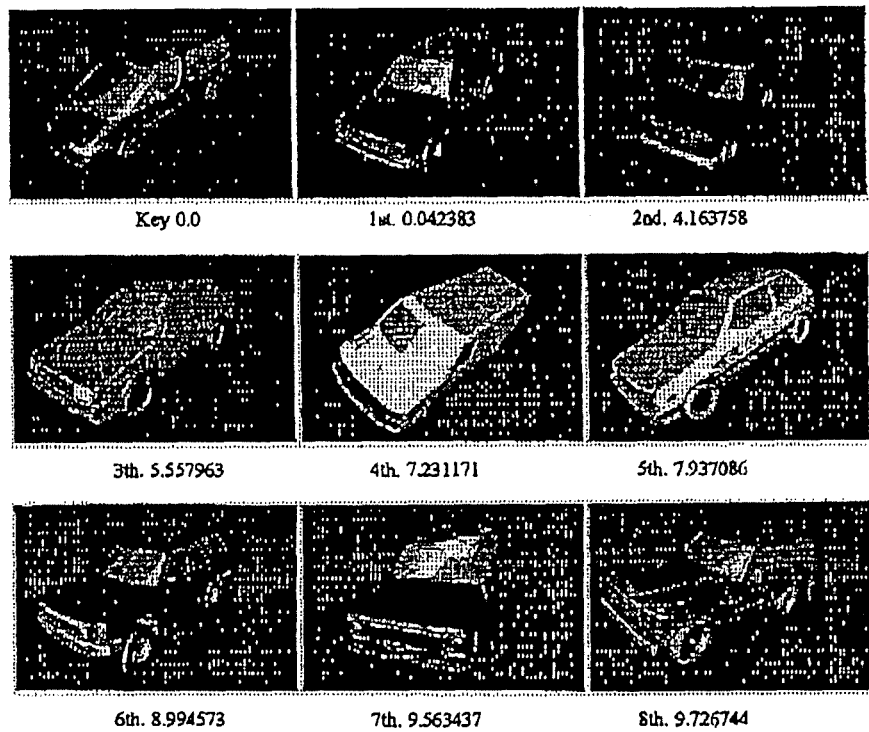
FIG. 6 is an example of performing shape similarity search with arbitrary polyhedral data as a search key.
FIG. 7 is an example showing the shape difference computed among polyhedral data of apparently different shapes and its table.

FIGS. 4, 5 and 6 show examples, to verify effectiveness of the present invention, of performing shape similarity search with arbitrary polyhedral data as a search key for polyhedral data of 250 cars of various types. As search keys, polyhedral data which seem to represent typical shapes of a coupe, a pickup truck and a van were selected. Effectiveness of the present invention is indicated by whether the same types of cars occupy high ranks of search. The polyhedral data at the upper left of each drawing is polyhedral data used as a search key, and others are eight top-ranked polyhedral data as a result of the search. The number below each drawing of polyhedral data is shape difference (degree of similarity in this case), which represents that the smaller the number is, the more similar the shape is. As shown in FIGS. 4, 5 and 6, the same vehicle types as those specified as search keys were extracted from polyhedral data of about 250 cars. FIG. 7 also shows the shape difference computed among polyhedral data of apparently different shapes in order to verify effectiveness of the shape difference computed by the present invention. Each individual row of the table below FIG. 7 represents individual comparison. In each row, the one with shape difference of 0.0 is the polyhedral data which was the criterion of individual comparison. Validity of the shape difference computed by the present invention is indicated by the fact that the figures in this table are apparently larger than those in FIGS. 4, 5 and 6 and that the shape difference computed between an airplane and a car is apparently larger than that computed among cars of different types.

Moreover, further detailed explanation is given about a method of keeping constant accuracy of similarity computed in the above comparison of polyhedrons, which is also a method whereby, if a polyhedral surface is converted into numbers by a function defined on a surface of a sphere of which center is the center of gravity of the polyhedron, functions can easily be associated even though mutual relationship of the polyhedral shapes changes.

First, how to generate sample points by Method 1 is concretely described. The position of the polyhedron is normalized. When a surface of the polyhedron is triangularly divided and the edges making up each triangle are mapped on a surface of a sphere of which center is the center of gravity of the polyhedron, each triangle is divided so that the lengths become shorter than a fixed length. Here, the edges will keep the lengths of the maps of the two triangles neighbouring the edges on a surface of a sphere of which center is the center of gravity of the polyhedron, and the edge list always has the edges sorted by the length of the maps of the edges on a surface of the sphere.

A pseudo code of this sample points generating method is listed as follows.

```
main( ){
Generate elist, an edge list
while (members of the edge list exist) {
Extract the longest edge e from elist
Eliminate e from elist
```

If (the length of e is equal to or more than the fixed length)
{
Insert a vertex in a position halving the edge
Divide the triangles neighbouring the edge
Add to the edge list the edges generated when dividing the triangles
}
}
}

Figure 11:
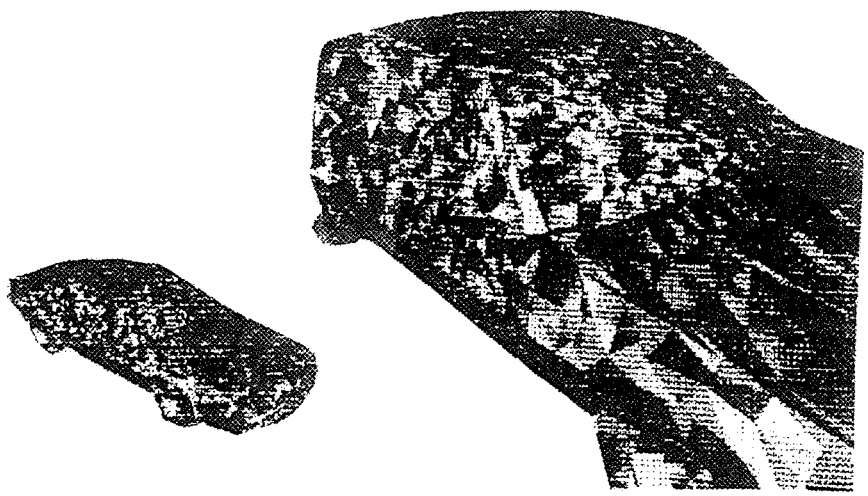
FIG. 11 is an example of a normalized mesh.

Also, FIG. 11 shows an example of a mesh normalized by Method 1. In FIG. 11, the left is a diagram overlooking the mesh making up the polyhedron normalized by Method 1. The triangles making up the mesh are represented in different colors. The right is a diagram enlarging a part of the mesh so that the state of mesh normalization can be more easily understood.

Next, how to generate sample points by Method 2 is concretely described. First, the position and direction of the polyhedron are normalized. And then, with the center of the defined sphere as a starting point, a point of intersection of the half line running though the point generated on a surface of the sphere and the polyhedron is sought. A pseudo code of this sample points generating method is listed as follows.
main( ){
Generate points equally on a surface of the sphere
Generate a half line running from the center of the sphere though the point on a surface of the sphere
for (all the half lines) {
Seek triangle t_i intersecting point x_i of intersection with the polyhedron
for (all x_i and t_i) {
Insert a vertex in a position of t_i in t_i
Triangularly divide t_i
}
}
}

Next, a concrete method for generating points equally on a surface of the sphere is described. Points are generated to be equal on a surface of a sphere of which center is the center of gravity of the polyhedron. A regular n-hedron inscribed in a sphere of which center is the center of gravity of the polyhedron is used, and new vertexes are inserted to halve all the edges until the number of vertexes reaches the goal, new edges linking newly inserted vertexes are inserted, and the vectors from the center of the sphere to all the vertexes are sought. And it is normalized so that the length of each vector becomes the radius of the defined sphere.

A pseudo code of this method of generating points equally on a spherical surface is listed as follows.
main( ){
Generate a regular n-hedron inscribed in a sphere while (until the number of vertexes reaches the goal) {
Insert new vertexes to halve all the edges
Insert new edges linking newly inserted vertexes
}
Seek the vectors from the center of the sphere to all the vertexes
Normalize so that the length of each vector becomes the radius of the defined sphere
}

Figure 12:
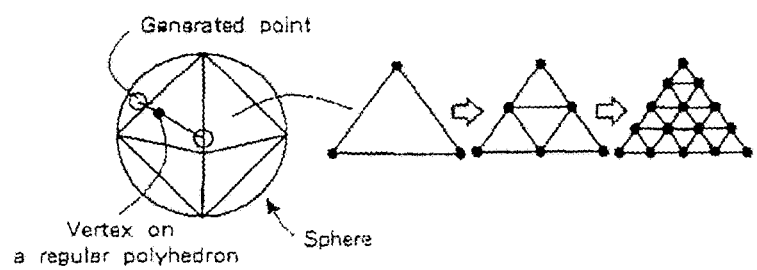
FIG. 12 is a diagram showing how to generate points evenly scattered on a surface of a sphere.

FIG. 12 illustrates a method of generating the points evenly scattered on a surface of a sphere. In FIG. 12, the center represents the center of the sphere and the regular polyhedron inscribed in the sphere. The vertexes on the regular polyhedron refer to those acquired by recursively splitting in four a triangle or a square making up the regular polyhedron as shown in the diagram. The generated points are a set of points acquired when the vectors linking the center with the vertexes on the regular polyhedron are normalized so as to be of the equal length, namely the points equally generated on a surface of the sphere.

Figure 13:
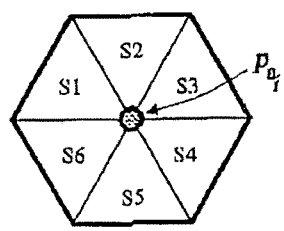
FIG. 13 is a diagram showing a node of a mesh.

Next, the method of computing a weight of a sample point by Method 3 is concretely described. The sample point to be input is a node of the mesh on a surface of the polyhedron. FIG. 13 illustrates a node of the mesh. In FIG. 13, $Pa_i$ refers to a sample point on polyhedron Pa. $S_0$ to $S_5$ are surfaces making up the mesh of polyhedron Pa, representing the area of each of the surfaces connected to sample point $Pa_i$. When attention is focused on a certain sample point $Pa_i$, weight $wa_i$ of sample point $Pa_i$ can be sought as follows by using the area $S_i$ of the surface connected to this point and the surface area S of the polyhedron.
Expression 18

$$wa_i = \sum_i \frac{S_i}{3S}$$

Next, the method of computing the weights of sample points by Method 4 is concretely described. In Method 3, sample point $Pa_i$ is projected on a surface of a sphere of which center is the center of gravity of the polyhedron. This is implemented by the following expression, if the radius of the sphere is r.
Expression 19

$$Pa_i = \frac{r}{|Pa_i|} Pa_i$$

As with Method 3, the weights of sample points can be acquired by the following expression using the area of the projected surface.
Expression 20

$$wa_i = \sum_i \frac{S_i}{3S}$$

Figure 14:
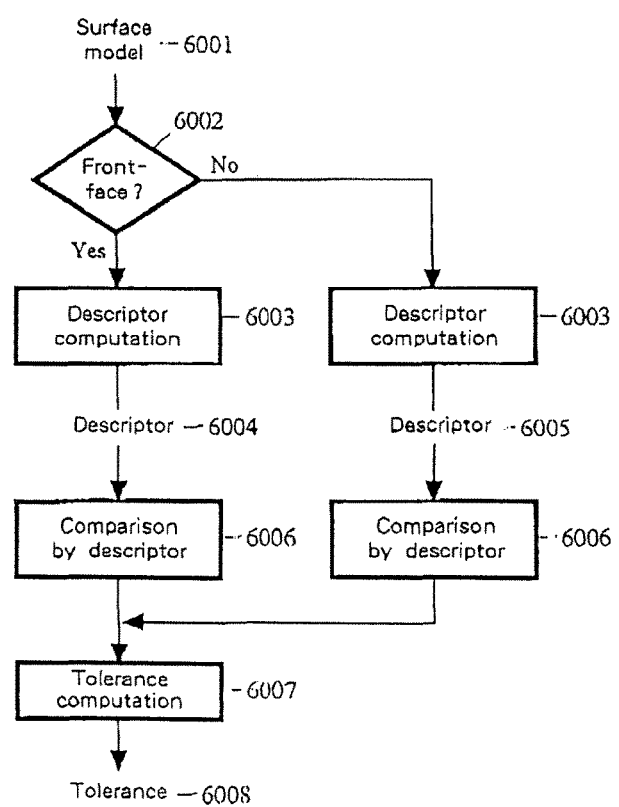
FIG. 14 is a diagram showing the structure of a tolerance-computing device.

Next, the method and device for applying to a moment function the methods of converting into numbers and comparing polyhedrons by Method 5 and Method 6 are concretely described. The overall structure is shown in FIG. 14. In FIG. 14, surface model 6001 represents the polyhedron to be input. Determination block 6002 classifies a sample point on the polyhedron to be input depending on whether it is a point on the front-face or a point on the back-face and also decides a sign of a weight accompanying each sample point. Descriptor 6003 represents a device for converting a polyhedron into numbers by a sample point classified by determination block 6002 and a weight accompanying a sample point. Descriptors 6004 and 6005 represent a polyhedron converted into numbers by a sample point classified by determination block 6002 and a weight accompanying the sample point. Block 6006 represents a comparison device for comparing polyhedrons converted into numbers and computing differences.

Block 6007 is a tolerance-computing device for computing tolerance form differences computed by block 6006.

Figure 15:
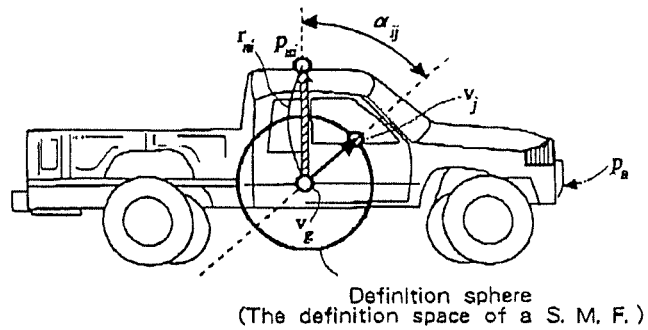
FIG. 15 is a drawing explaining the parameters for converting a polyhedron into numbers.

Based on FIG. 15, a means for converting a polyhedron into numbers is described as follows, assuming that each point on polyhedron Pa is $Pa_i$ and its weight is $Wa_i$. In FIG.

15, parameters used for converting into numbers and comparing polyhedron Pa by a moment function are explained. $Pa_i$ represents a sample point of polyhedron Pa. "Definition sphere" represents a sphere that is a defined area of a moment function expressing a polyhedron converted into numbers. The center of this sphere is the center of gravity of polyhedron Pa. $ra_i$ represents the distance from the center of gravity of the polyhedron to each $Pa_i$. Vj represents the points equally generated on a surface of the sphere of which center is the center of gravity of the polyhedron, and is used for comparing moment functions. $\sqcap_{ij}$ represents the angle formed by $Pa_i$ and Vj, a vector of which starting point is the center of gravity of the polyhedron. Subscript i corresponds to each sample point, and subscript j to point Vj on each sphere. If each $Pa_i$ is classified by the following method into a point on the front-face and a point on the back-face, and conversion into numbers is performed in two ways, namely by assigning the same sign of a weight to a point on the front-face and a point on the back-face, and by assigning different signs of weight to them.

1) Each surface is classified into the front-face and the back-face depending on the directional relation of the radial vector running from its center of the normal and surface toward the center of the surface (determined by whether inner product of the radial vector normal is positive or negative).

2) At each vertex, it is classified as on the front-face if all the surfaces surrounding a vertex are the front-faces, and on the back-face if all are back-faces (if on the boundary, it is deemed the front-face).

3) In computing moment functions, conversion into numbers are performed in two ways as follows in the n-th primary moment function and secondary moment function.

Primary Moment Function:

If the same sign of a weight is assigned to a point on the front-face and a point on the back-face, Expression 21

$$M_{a10}(v_j) = v_j \left( \sum_i wa_i (|Pa_i|^{(n/2-1)} Pa_i)^T (|Pa_i|^{(n/2-1)} Pa_i) + \sum_i wa_i (|Pa_i|^{(n/2-1)} Pa_i)^T (|Pa_i|^{(n/2-1)} Pa_i) \right) v_j^T$$

If different signs of weights are assigned to a point on the front-face and a point on the back-face, Expression 22

$$M_{a11}(v_j) = v_j \left( \sum_i wa_i (|Pa_i|^{(n/2-1)} Pa_i)^T (|Pa_i|^{(n/2-1)} Pa_i) - \sum_i wa_i (|Pa_i|^{(n/2-1)} Pa_i)^T (|Pa_i|^{(n/2-1)} Pa_i) \right) v_j^T$$

Secondary Moment Function:

If the same sign of a weight is assigned to a point on the front-face and a point on the back-face, Expression 23

$$M_{a20}(v_j) = v_j \left( \sum_k wa_k |Pa_k|^{n-1} Pa_k + \sum_l wa_l |Pa_l|^{n-1} Pa_l \right)$$

If different signs of weights are assigned to a point on the front-face and a point on the back-face, Expression 24

$$M_{a21}(v_j) = v_j \left( \sum_k wa_k |Pa_k|^{n-1} Pa_k - \sum_l wa_l |Pa_l|^{n-1} Pa_l \right)$$

where, subscript k represents a sample point on the front-face, and subscript 1 represents a sample point on the back-face.

The following shows a method of seeking a difference between polyhedron Pa and polyhedron Pb by the moment functions acquired from polyhedron Pa, namely $M_{a10}(V_j)$, $M_{a11}(V_j)$ $M_{a20}(V_j)$, $M_{a21}(V_j)$, and the moment functions acquired from polyhedron Pb, namely $M_{b10}(V_j)$, $M_{b11}(V_j)$, $M_{b20}(V_j)$, $M_{b21}(V_j)$. Difference $d_1$ of the primary moment function is sought by the following expression.

Expression 25

$$d_1 = \sum_j ((M_{a10}(v_j) - M_{b10}(v_j))^2 + (M_{a11}(v_j) - M_{b11}(v_j))^2)$$

Difference of the secondary moment function is sought by text such as books or CDs, so it has been considered unsuitable for any product such as furniture for which a customer must see either the real thing or a high-quality image before wondering whether to purchase it, also due to constraints on image quality imposed by the band width of Internet. The present invention is a system wherein, based on an image of the customer's room sent from the customer over the network, a new service of performing simulation of placing furniture in the customer's room is provided to promote sale of furniture at an online store while accumulating on the seller's side the images of the rooms and the shapes of the products that interested the customers in conjunction with the customers' profiles.

A customer selects any product that interests him or her at an online store on a Web page and requests placement simulation attaching his or her own room's image. The online store searches the received image and the designated product or any product of a similar design to it from its shape, uses a scene synthesized from the room's image and the product's 3D model to perform presentation of the product and store a log of operations, and lets the customer know the access point. The customer considers a purchase while reproducing the store's proposal and actually placing the furniture at various places on his or her own machine. It is also possible to call the store's operator as required and consider it while sharing a synthesized scene in real time. In the process of such exchanges with customers, the store can collect on the customer DB the images of the customers' rooms and the designs (3D-shaped) that interested the customers together with the customers' profiles. This system comprises the departments of synthesized scene generation, similar products search, and synchronous and asynchronous sharing. Details of each department are described below.

1) Synthesized Scene Generation Department

Figure 16:
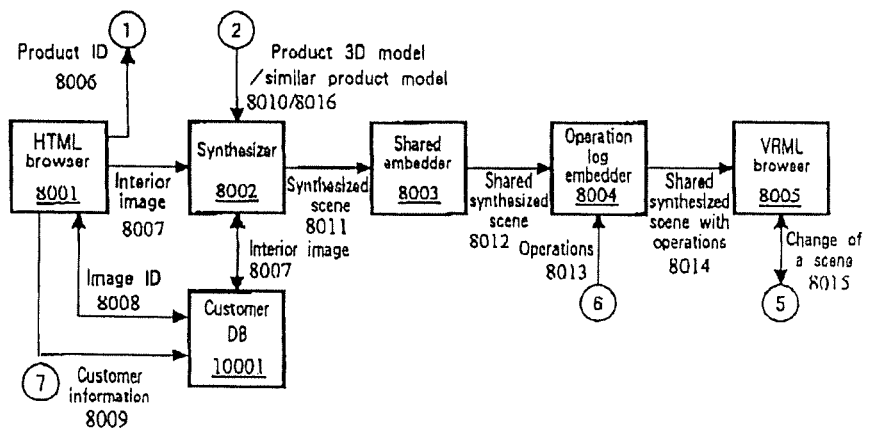
FIG. 16 is a diagram showing the synthesized scene generation department.

A room's image and 3D furniture models are synthesized by using a virtual screen on which the room's image photographed by a customer is pasted and 3D furniture models that are arbitrarily movable on a virtual floor so that furniture placement can be simulated in any position on the room's floor and on any surface parallel with the floor (for instance, on a table or a shelf). FIG. 16 shows such a synthesized scene.

In FIG. 16, HTML browser (8001) is a device for browsing HTML contents placed on Internet. In this embodiment, the HTML content placed on Internet is an entrance to the store. In this diagram, it refers to the mail software integrated in addition to the HTML content browser. Here, a customer browses the goods of the online store and selects interesting ones. Product ID (8006) selected from the HTML browser is sent to 3D product DB (9002). Also, to verify how it looks when the product is placed in his or her room, interior image (8007) of his or her room photographed by the customer with a digital camera is attached to an e-mail and sent to the online store. The sent image is registered on the customer DB and the ID of the registered image is sent to the customer.

Synthesizer (8002) is a device that synthesizes interior image (8007) photographed by the customer and 3D product model (8010) and similar product model (8016) searched at the similar products search department so as to describe and create in VRML synthesized scene (8011) that appears as if 3D product (8010) or similar product model (8016) were placed in the room. Shared embedder (8003) adds to synthesized scene (8011) description in VRML for sharing via shared server (10001) and creates shared synthesized scene (8012). Operation log embedder (8004) is used by the store's operator to add to shared synthesized scene (8012) as operations (8013) actions and annotations for presentation of products, and creates a shared synthesized scene with operations (8014). VRML browser (8005) replays on a customer's machine a shared synthesized scene with operations (8014) which was created adding presentation of products, or shares in real time a synthesized scene as required on the customer's machine and the store operator's machine via shared server (10001) to allow presentation of products.

The data flowing among the blocks in FIG. 16 is explained as follows. Product ID (8006) is an ID representing each product. Interior image (8007) is an image of his or her room photographed by the customer with a digital camera. Image ID (8008) is an ID of an interior image in customer DB (10001). Customer information (8009) is information of a customer's name, address, age, sex, occupation, interested product, products presented by the online store, and actually purchased product. Product 3D model (8010) is 3D contents that describe in VRML a polyhedron representing a product selected by a customer. Similar product model (8010) is 3D contents of a polyhedron that describe in VRML a product similar to a polyhedron representing a shape of a product selected by a customer. Synthesized scene (8011) is contents described in VRML that appear as if a product 3D model and a similar product model were placed in a room of the interior image. Shared synthesized scene (8012) is synthesized scene (8011) with added description for sharing VRML contents between the customer and the store's operator. Operations (8013) are actions and annotations to be added to shared synthesized scene (8012) by the store's operator. Shared synthesized scene with operations (8014) is shared synthesized scene (8012) with added actions and annotations for presentation of products by the store's operator. Moreover, (1) to (6) in the diagram indicates that they are connected to corresponding points in FIGS. 17 and 18.

(2) Similar Products Search Department

Figure 17:
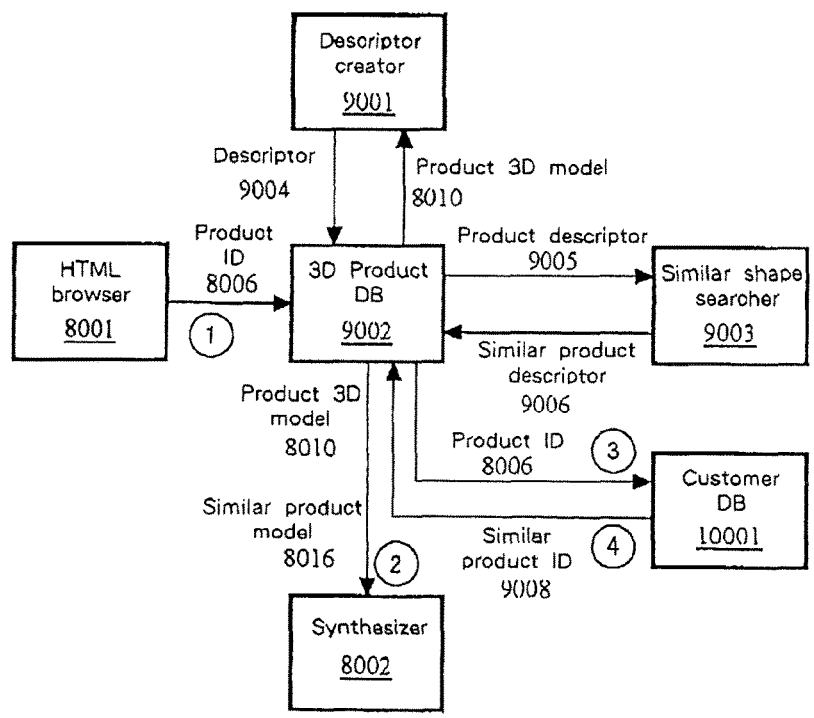
FIG. 17 is a block diagram of the similar products search department.

The similar products search department deems a design (shape) of a customer's interested 3D model to be the key and searches products of a similar shape, and then presents the customer a placement simulation to the customer's room. Also, in performing a similar shape search, it searches the store's recommended products to present the customer a placement simulation of recommended products of a similar shape. In addition, it responds to the customer's requests for simulations and purchases and thereby collects on a customer DB the images of the rooms photographed by the customers, 3D models of the customers' interested products, the recommended products presented by the online store against the customers' interested products, and the products actually purchased by customers. FIG. 17 shows a block diagram of the similar products search department.

In FIG. 17, 3D product DB (9002) accumulates 3D product models (8010) of a shape of a product sold at an online store, and performs a search for a product that interested a customer by product ID (8006) delivered by an HTML browser and a search for a similar shape by descriptor (9004) that is the shape of the product corresponding to the product ID (8006) delivered by the HTML browser and converted into numbers so as to present products similar to the one that interested the customer. Product ID (8006) of a product that interested a customer and similar product ID (9008) that is an ID of a similar product are stored in customer DB (10001) as part of customer information (8009). Descriptor creator (9001) delivers to 3D product DB (9002) descriptor (9004) that is 3D product model (8010) stored in 3D product DB converted into numbers based on its shape. 3D product DB (9002) accumulates descriptors (9004) that are polyhedrons representing products and converted into numbers by moment functions, associating them with 3D product model (8010). In a similar shape search of a product in 3D product DB (9002), similar shape searcher (9003) receives from 3D product DB (9002) descriptor (9004) of a product that is the key, and returns descriptor (9004) of a product of a shape similar to the product that is the key out of descriptors (9004) stored in 3D product DB. In 3D product DB (9002), a corresponding product 3D model is searched as similar product model (0016) from descriptors (9004) of similar products, and is delivered to synthesizer (8002).

The data flowing among the blocks in FIG. 17 is explained as follows. Descriptor (9004) represents a product 3D model converted into numbers by a moment function. Product descriptor (9005) represents a descriptor that is a polyhedral model representing a shape of a product in which a customer is interested and converted into numbers by a moment function. Similar product descriptor (9006) represents a descriptor of a product of a shape similar to a product corresponding to product descriptor (9005). Similar product ID (9008) represents an ID of a product of a shape similar to a product in which a customer is interested and searched by the 3D product DB.

(3) Synchronous and Asynchronous Sharing Department

Figure 18:
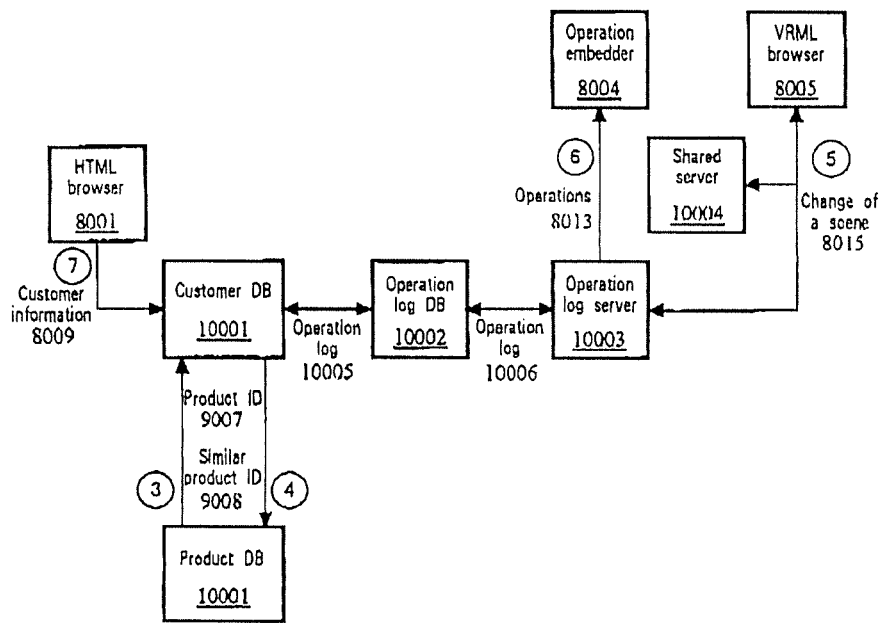
FIG. 18 is a block diagram of the synchronous/asynchronous sharing department.

The synchronous and asynchronous sharing department accumulates in the operation DB the operations of a store's operator for each product registered in the customer DB, synthesizes a scene from created customer information on demand, and creates the contents for reproducing the operator's demonstration so as to allow the customer to perform and review via Internet a simulation of placing furniture in the room at any time and as often as he or she likes. FIG. 18 shows a block diagram of the synchronous and asynchronous sharing department.

In FIG. 18, customer DB (10001) manages a customer's name, address, age, sex, occupation, interested product, products presented by the online store, and actually purchased product acquired from an HTML browser. It also manages operation log ID (10002) for presentation of a product added to the product in which a customer is interested. Operation log DB (10002) manages operation log ID (10002) received from customer DB and operation log (10006) of a presentation for a corresponding product in an associated manner. Operation log server (10003) acquires an operation of an online store's operator in a VRML browser as change of a scene (8015), and registers it in operation log DB (10002) or delivers to embedder (8004) an operation log of a presentation by the online store's operator output from operation log DB (10002) so as to embed it in a shared synthesized scene with operations to be downloaded by the customer.

The data flowing among the blocks in FIG. 18 is explained as follows. Operation log ID (10005) is an ID of each product 3D model, and is managed in association with a product 3D model in customer DB (10001) and in association with operation log (10006) of a presentation for a product in the operation log DB respectively. Operation log (10006) is a recording of a presentation added to each product 3D model by the online store's operator. It is accumulated in operation log DB (10002) from a VRML browser via operation log server (10003), and is reproduced on the VRML browser from operation log DB (10002) via operation embedder (8004) at a request from customer DB (10001).

Figure 19:
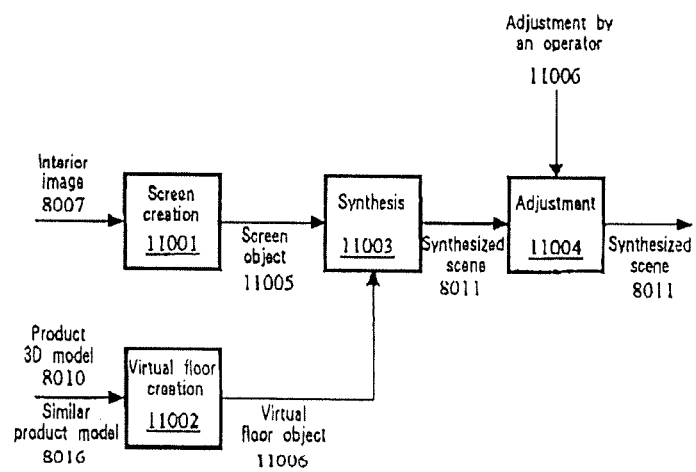
FIG. 19 is a block diagram of the synthesizer of the synthesized scene generation department.

Next, FIG. 19 shows a block diagram of a synthesizer that forms the heart of the synthesized scene generation department. In FIG. 19, screen creation (11001) creates screen object (11005) shown in FIG. 20 from a customer's interior image (8007). Virtual floor creation (11002) creates virtual floor object (11006) accompanied by a user interface for freely moving with a mouse product 3D model (8010) and similar product model (8016) on a virtual floor. It synthesizes screen object (11005) and virtual floor object (11006) created by synthesis (11003), and creates synthesized scene (8011) appearing as if product 3D model (8010) and similar product model (8016) were placed in interior image (8007). The online store's operator adjusts the positional relationship between a virtual screen with pasted interior image (8007) in synthesized scene (8011) created in adjustment (11004) and the virtual floor where product 3D model (8010) and similar product model (8016) move.

Figure 20:
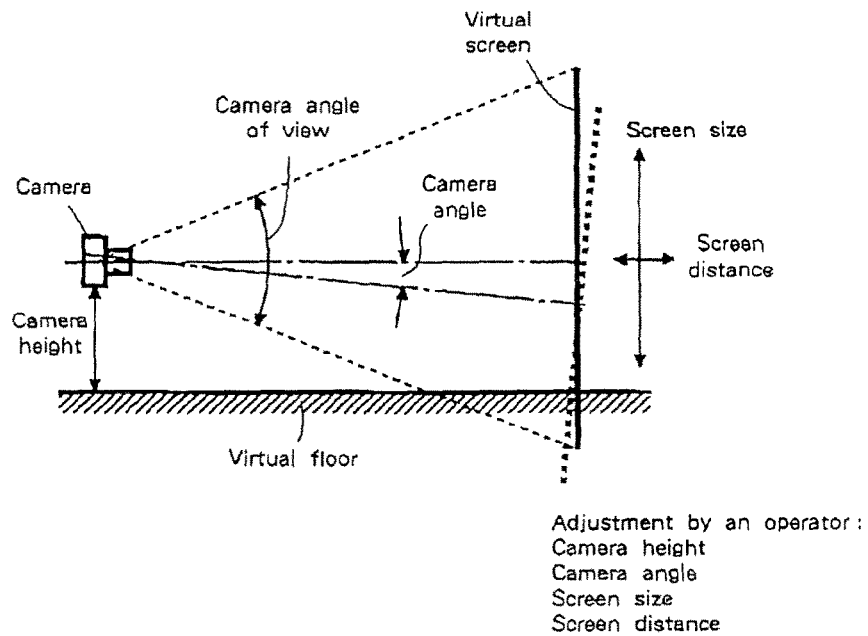
FIG. 20 is a diagram explaining a screen object.
Figure 21:
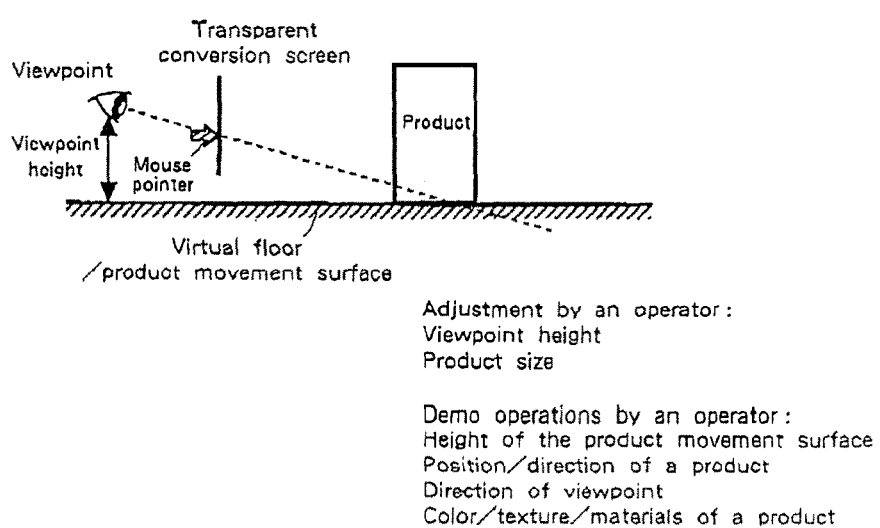
FIG. 21 is a diagram explaining a virtual floor object.

FIG. 20 is a diagram explaining a screen object. A screen object is created in advance by screen creator (11001). As shown in FIG. 20, a screen object is storage as electronic image data of an image created by a camera geometrically placed to make natural synthesis with a virtual floor object. On a screen object, texture sent from a user such as a user's room is electronically pasted. FIG. 21 is a diagram explaining a virtual floor object. A virtual floor object is storage as electronic image data of a floor image created to make natural synthesis with a screen object. His or her own room's image photographed by a customer is pasted as texture on the screen of a screen object, and the positional relationship between the floor and the image is adjusted with the camera angle by the operator's operations, and the relationship between the image and the product size is adjusted with the screen distance or the screen size. Here, the image represents a user's interior image, which is a screen object with pasted texture.

A product 3D model is bound to move in parallel with the floor of a virtual floor object, and is always located at a point where a line linking the mouse pointer on the screen with the starting point and the floor intersect. A virtual floor may have its height changed by the user interface attached to the virtual floor object. Thus, it allows a simulation not only of furniture placed on the floor but also of a product 3D model placed on a surface parallel with the floor in the image, on a table for instance.

Figure 22:
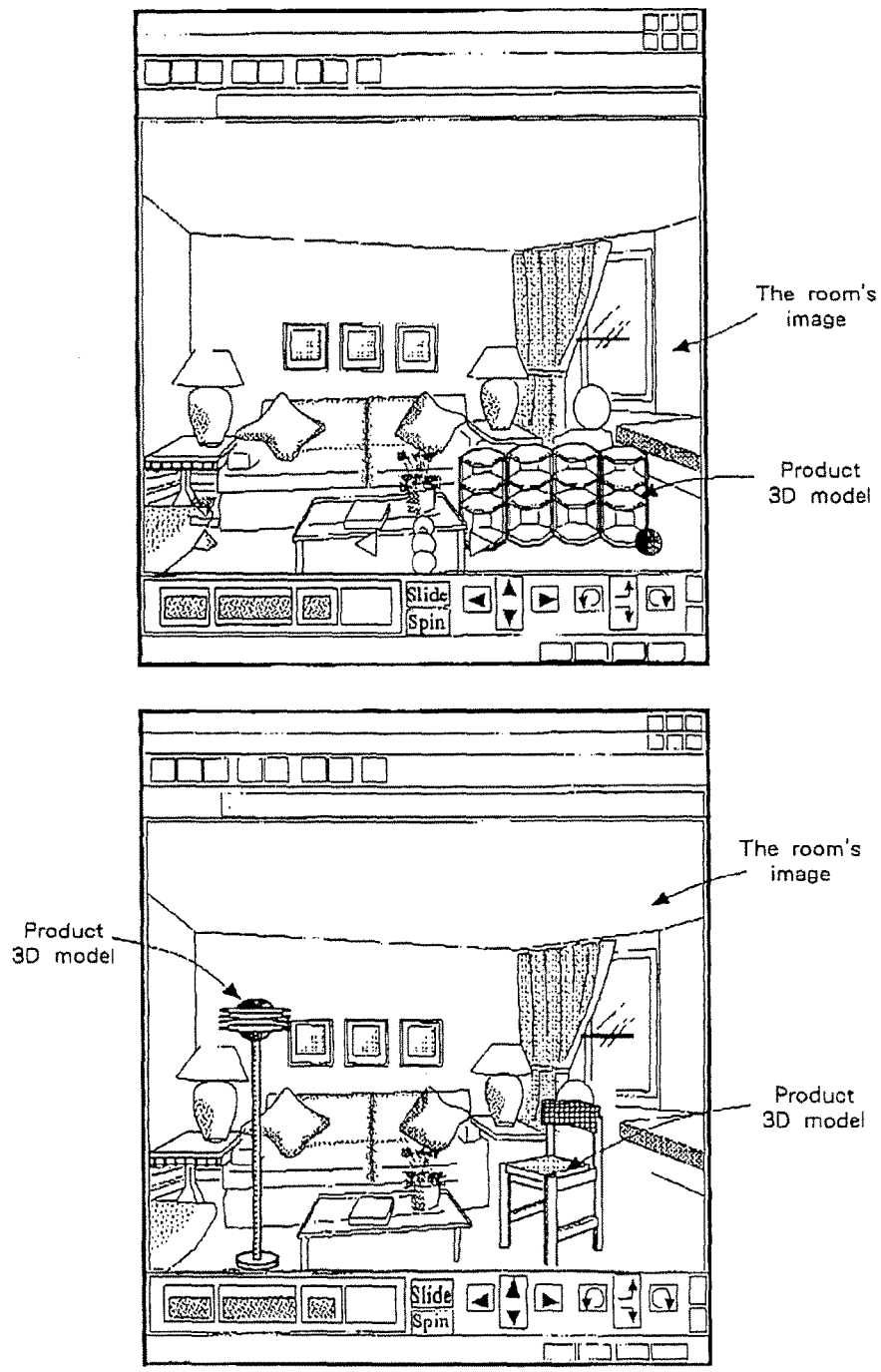
FIG. 22 is an example of synthesis of an online store by the present invention.

FIG. 22 shows a state where a synthesized scene in an online store displayed by a VRML browser. In the synthesized scene in FIG. 22, the object indicated as the room's image is interior image (8007) in FIG. 16. The object indicated as 3D product model is product 3D model (8010) in FIG. 16, and is displayed as if product 3D model (8010) were placed in interior image (8007). Moreover, product 3D model (8010) can be dragged by a mouse to place product 3D model (8010) anywhere on the floor for simulation of furniture.

Furthermore, in operation, customers providing images of their rooms are offered a discount or a privilege to promote this embodiment so as to alleviate resistance against leakage of private information. This embodiment is to promote sales by providing a service of simulation by virtual reality to sell merchandise such as furniture, which generates an added value different from high-grade images, and also collect and accumulate the images of the customers' rooms and the shapes of products that interested the customers together with their profiles. In addition, needless to say, it can be applied to online stores dealing in not only furniture but also various products such as automobiles, accessories and supplies.

Figure 8:
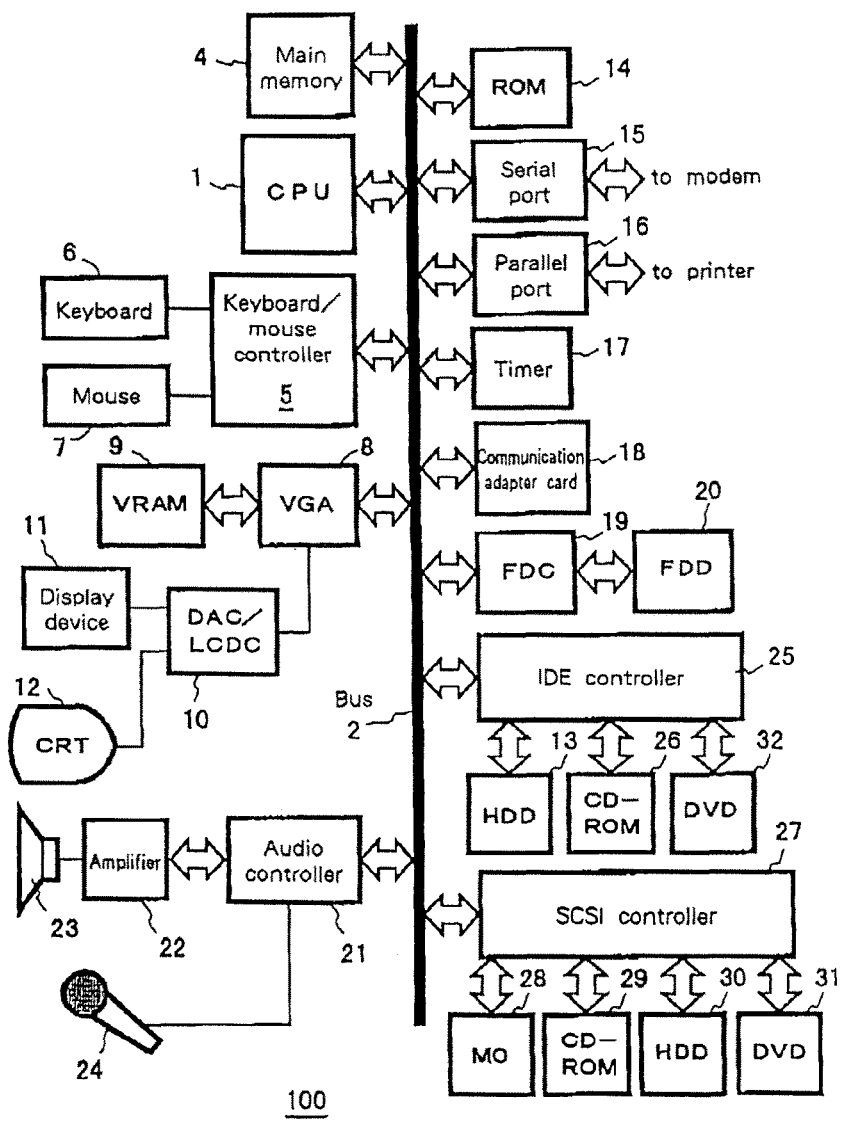
FIG. 8 is an embodiment of hardware configuration of the shape similarity search system used in the present invention.
Figure 9:
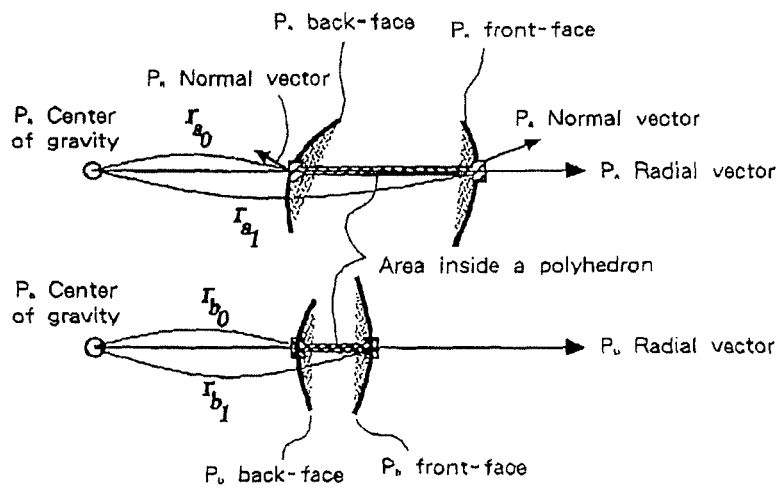
FIG. 9 is a drawing showing a distance to the boundary of the area inside the polyhedron.
Figure 10:
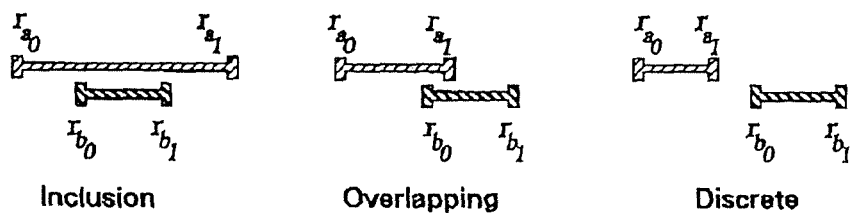
FIG. 10 is a drawing showing classification of inclusion, overlapping and discrete.

FIG. 8 shows an embodiment of hardware configuration of the similarity shape comparison, search, and online store system used in the present invention. System 100 comprises central processing unit (CPU) 1 and memory 4. CPU 1 and memory 4 are connected via bus 2, and via hard disk drive 13 as an auxiliary storage (or a storage media drive such as MO, CD-ROM 23 or DVD) and IDE controller 25. Likewise, CPU 1 and memory 4 are connected via bus 2, and via hard disk drive 30 as an auxiliary storage (or a storage media drive such as MO 28, CD-ROM 23 or DVD) and SCSI controller 27. Floppy disk drive 20 is connected with bus 2 via floppy disk controller 19. Preferably, polyhedral data should be stored on an auxiliary storage.

A floppy disk is inserted into floppy disk drive 20, and this floppy disk, hard disk drive 13 (or a storage media drive such as MO, CD-ROM or DVD) and ROM 14 can store code of a computer program or data for issuing an instruction to CPU in synergy with an operating system and implementing the present invention, which is executed by being loaded on memory 4. This code of a computer program can also be compressed or split into several for storing on more than one media.

System 100 can further be equipped with user interface hardware and comprise pointing device (a mouse, a joystick, etc.) 7, keyboard 6 or display 12 for presenting visual data to a user. Preferably, searched polyhedral data, synthesized scenes and so on should be displayed on display 12. It is also possible to connect with a printer via parallel port 16 or to connect with a modem via serial port 15. This system 100 can communicate with other computers, etc. by being connected to a network via serial port 15 and a modem or a communication adapter 18 (Ethernet or token-ring card), etc. For instance, polyhedral data on a remote server may be made an object of computation via communication adapter 18. Or via Internet, it is also possible to download and search polyhedral contents on Web. It is also possible to exchange data over infrared rays or the radio by connecting a remote transmitter-receiver to serial port 15 or parallel port 16.

Speaker 23 receives via amplifier 22 an audio signal D/A (digital/analog) converted by audio controller 21 so as to output it as voice. Audio controller 21 also makes it possible to A/D (analog/digital) convert audio data received from microphone 24 and incorporate into the system audio data from outside. For instance, search processing can be instructed by voice by using ViaVoice (a trademark of IBM Corp.), etc.

Thus, it will be easily understood that the system used in the present invention can be implemented by means of a communication terminal with a communication facility including an ordinary personal computer (PC) or a workstation, a notebook PC, a palmtop PC, a network computer, various household electrical appliances such as a TV set with a built-in computer, a game machine with a communication facility, a telephone, a fax, a portable telephone, a PHS and an electronic organizer or a combination of those. However, these components are quoted by way of illustration, and all of them are not essential components of the present invention.

Advantages of the Invention

It becomes possible to compare polyhedral data with limited information while keeping some accuracy by using the present invention and accurately converting a feature of a polyhedral shape into numbers. It also becomes possible to acquire tolerance with arbitrary accuracy by increasing or decreasing the number of samplings.

The invention claimed is:

1. A 3D-model display and search system, comprising
a display for displaying a 3D-model;
a 3D-model database storing a plurality of polyhedrons; and
one or more computers configured to perform for each of said plurality of polyhedrons
comparing directions of radial vectors from a center of gravity of the polyhedron to sample points on a surface thereof and a normal vector of the sample points thereon,
based on the comparison, dividing the sample points into a first set of sample points of the same directions and a second set of sample points of different directions, and
based on a coordinate value of each sample point and a weight value given in advance to each sample point, converting the first and second sets into numbers, and
storing the numbers on said 3D-model database as a plurality of values for each polyhedron,
said display, 3D-model database, and one or more computers being configured to perform for an input that is a 3D-model used as a search query, performing the steps of comparing, dividing, and converting to produce a plurality of search values,
comparing said plural values stored on said 3D-model database with said plurality of search values, and
displaying on said display a polyhedron from the 3D-model database having stored values closest to the search values.

2. The system according to claim 1 wherein said display is configured to display a plurality of polyhedrons from the 3D-model database in an order of best to worst match from the comparison step.

* * * * *